United States Patent
Koops et al.

(10) Patent No.: US 8,055,742 B2
(45) Date of Patent: Nov. 8, 2011

(54) NETWORK MANAGEMENT SYSTEM FOR MANAGING NETWORKS AND IMPLEMENTING SERVICES ON THE NETWORKS USING RULES AND AN INFERENCE ENGINE

(75) Inventors: Mark Koops, Montlhery (FR); Arnaud Gonguet, Paris (FR); Olivier Poupel, Tinteniac (FR)

(73) Assignee: Alcatel Lucent, Paris (FR)

( * ) Notice: Subject to any disclaimer, the term of this patent is extended or adjusted under 35 U.S.C. 154(b) by 1177 days.

(21) Appl. No.: 10/629,682

(22) Filed: Jul. 30, 2003

(65) Prior Publication Data

US 2004/0054769 A1    Mar. 18, 2004

(30) Foreign Application Priority Data

Jul. 31, 2002    (FR) .................................... 02 09741

(51) Int. Cl.
- *G06F 15/173* (2006.01)
- *G06F 15/177* (2006.01)
- *G06F 17/00* (2006.01)
- *G06N 5/02* (2006.01)

(52) U.S. Cl. ............ 709/223; 706/45; 706/47; 709/220; 709/226

(58) Field of Classification Search .................. 709/223, 709/220, 226; 706/45, 47
See application file for complete search history.

(56) References Cited

U.S. PATENT DOCUMENTS

| | | | | |
|---|---|---|---|---|
| 5,175,800 A | * | 12/1992 | Galis et al. ....................... | 706/45 |
| 5,377,196 A | * | 12/1994 | Godlew et al. ................. | 714/712 |
| 5,687,290 A | * | 11/1997 | Lewis ............................. | 706/45 |
| 5,692,106 A | * | 11/1997 | Towers et al. ................... | 706/45 |
| 5,701,394 A | * | 12/1997 | Arita et al. ....................... | 706/10 |
| 5,761,432 A | * | 6/1998 | Bergholm et al. ............. | 709/226 |
| 6,079,020 A | * | 6/2000 | Liu ................................. | 726/15 |
| 6,108,309 A | * | 8/2000 | Cohoe et al. .................. | 370/241 |
| 6,313,863 B1 | * | 11/2001 | Chida .......................... | 348/14.01 |
| 6,330,586 B1 | * | 12/2001 | Yates et al. .................... | 709/201 |
| 6,370,572 B1 | * | 4/2002 | Lindskog et al. ............. | 709/223 |
| 6,446,123 B1 | * | 9/2002 | Ballantine et al. ............ | 709/224 |
| 6,449,650 B1 | * | 9/2002 | Westfall et al. ............... | 709/228 |
| 6,470,384 B1 | * | 10/2002 | O'Brien et al. ............... | 709/223 |
| 6,473,748 B1 | * | 10/2002 | Archer ........................... | 706/45 |
| 6,477,566 B1 | * | 11/2002 | Davis et al. ................... | 709/223 |
| 6,560,633 B1 | * | 5/2003 | Roberts et al. ................ | 709/202 |
| 6,577,327 B1 | * | 6/2003 | Rochford et al. ............. | 715/735 |
| 6,711,137 B1 | * | 3/2004 | Klassen et al. ................ | 370/252 |
| 6,751,661 B1 | * | 6/2004 | Geddes ......................... | 709/223 |
| 6,766,364 B2 | * | 7/2004 | Moyer et al. .................. | 709/221 |
| 6,901,440 B1 | * | 5/2005 | Bimm et al. .................. | 709/223 |
| 6,954,788 B2 | * | 10/2005 | Barnett et al. ................ | 709/223 |
| 7,024,450 B1 | * | 4/2006 | Deo et al. ...................... | 709/203 |

(Continued)

OTHER PUBLICATIONS

A. A. Covo, T. M. Moruzzi, and E. D. Peterson, "AI- Assisted Telecommunications Network Management", 1989, IEEE, CH2682-3/89/0000-0487, pp. 0487-0491.*

(Continued)

*Primary Examiner* — Tonia L. M. Dollinger
*Assistant Examiner* — Daniel Murray
(74) *Attorney, Agent, or Firm* — Sughrue Mion, PLLC

(57) ABSTRACT

A network management system for implementing a service on a network acquires policy rules for configuring the service, determines commands corresponding to the policy rules and transmits them to network elements, and infers the rules in order to determine the commands. The rules comprise services rules and implementation rules.

20 Claims, 1 Drawing Sheet

U.S. PATENT DOCUMENTS

| | | | |
|---|---|---|---|
| 7,024,475 B1* | 4/2006 | Abaye et al. | 709/224 |
| 7,051,243 B2* | 5/2006 | Helgren et al. | 714/48 |
| 7,130,898 B2* | 10/2006 | Carter | 709/223 |
| 7,451,071 B2* | 11/2008 | Ferguson et al. | 703/22 |
| 7,457,853 B1* | 11/2008 | Chari et al. | 709/220 |
| 7,603,445 B1* | 10/2009 | Fehrle | 709/220 |
| 2002/0026503 A1* | 2/2002 | Bendinelli et al. | 709/220 |
| 2002/0083344 A1* | 6/2002 | Vairavan | 713/201 |
| 2002/0161888 A1* | 10/2002 | McGuire | 709/226 |
| 2002/0178380 A1* | 11/2002 | Wolf et al. | 713/201 |
| 2002/0194584 A1* | 12/2002 | Suorsa et al. | 717/176 |
| 2003/0028825 A1* | 2/2003 | Hines | 714/37 |
| 2003/0084135 A1* | 5/2003 | Narain | 709/223 |
| 2003/0133556 A1* | 7/2003 | Naik et al. | 379/201.12 |
| 2003/0204622 A1* | 10/2003 | Blizniak et al. | 709/241 |
| 2004/0003065 A1* | 1/2004 | Barnett et al. | 709/223 |
| 2005/0010659 A1* | 1/2005 | Gonguet et al. | 709/223 |
| 2005/0050193 A1* | 3/2005 | Edwiges et al. | 709/223 |
| 2005/0165906 A1* | 7/2005 | Deo et al. | 709/217 |
| 2007/0258422 A1* | 11/2007 | Herrmann | 370/338 |
| 2010/0274805 A9* | 10/2010 | Tanabe et al. | 707/770 |
| 2011/0047418 A1* | 2/2011 | Drees et al. | 714/57 |

OTHER PUBLICATIONS

Kyu-Young Whang and Stephen Brady, "High Performance Expert System-DBMS Interface for Network Management and Control", 1989, IEEE, 0733-8716/89/0400-0408, pp. 408-417.*

Yang Yongjian and Han Songyang, "Expert System-Intelligent Management for ATM Network", 1999, IEEE, 0-7803-5731-0/99, pp. 810-813.*

Newton, Harry "Newton's Telecom Dictionary", Feb. 2006, CMP Books, 22nd Ed., pp. 982-983.*

Newton, Harry. "Newton's Telecom Dictionary" 2006, CMP Bokks, 22nd ed., pp. 124, 501, 604, 785, 982, and 983.*

Dictionary.com, "template," in Dictionary.com Unabridged. Source location: Random House, Inc. http://dictionary.reference.com/browse/template. Available: http://dictionary.reference.com. Accessed: Sep. 22, 2010.*

Hung C.K., Lai E. M.-K.: "An intelligent assistant for the management of telecommunications netwrk services" IEEE, 1994, pp. 234-237, XP002240928.

* cited by examiner

FIG_1 RELATED ART
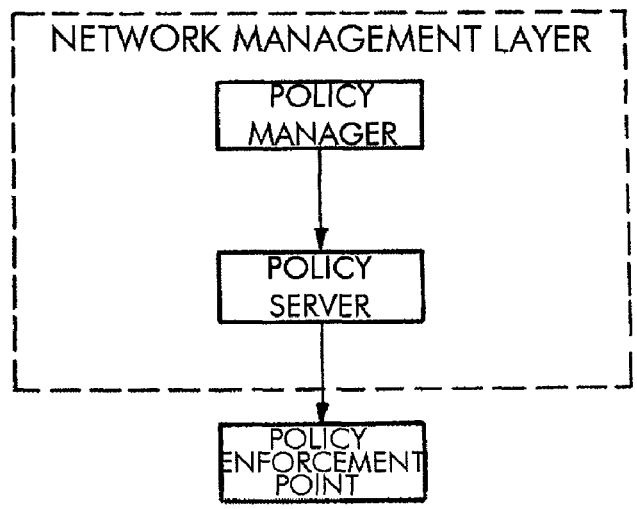
FIG_2
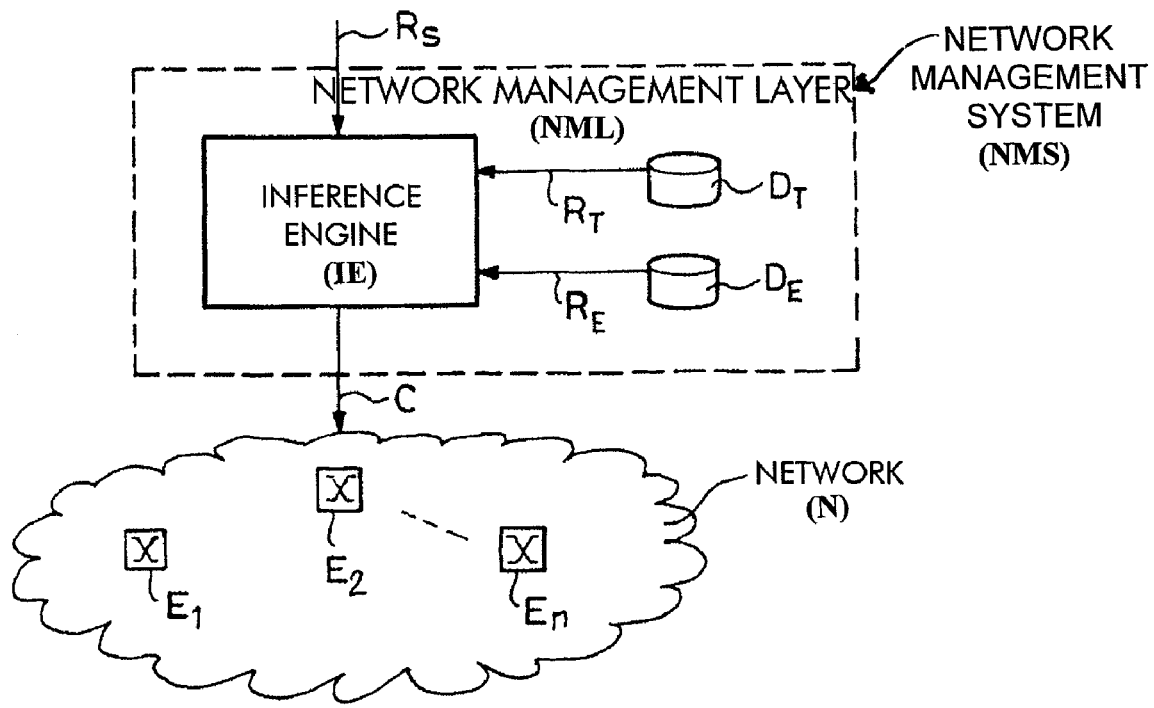

NETWORK MANAGEMENT SYSTEM FOR MANAGING NETWORKS AND IMPLEMENTING SERVICES ON THE NETWORKS USING RULES AND AN INFERENCE ENGINE

CROSS-REFERENCE TO RELATED APPLICATIONS

This application is based on French Patent Application No. 02 09 741 filed Jul. 31, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the field of telecommunications services management. To be more precise, it relates to the management of telecommunication services using policy rules. The invention applies particularly well to networks using protocols of the Internet Protocol (IP) family or other protocols of higher level.

2. Description of the Prior Art

Such networks provide services of various types, including virtual private networks (VPN), videoconferences, etc.

The provision of these services impacts on the behavior expected of the network. The expected behavior can include compliance with a particular quality of service (QoS) associated with the service. In this case, the quality of service is negotiated between at least the operator of the telecommunication network and the provider of the service, in the form of a service level agreement (SLA). The SLA is then specified in a more technical form in a service level specification (SLS), which can conform to the specifications of the Internet engineering task force (IETF).

In other words, the SLS is derived from an SLA and contains the technical parameters that must be used to implement the service.

To provide a service on a telecommunication network, it is therefore necessary to set the network parameters to enable the service to be established, including compliance with the negotiated quality of service, for example.

The parameters can be set using policy rules, referred to for simplicity hereinafter as rules. The rules typically include a set of conditions and a set of actions. The sets can be reduced to a single element, i.e. a rule may consist of only one condition and/or only one action.

FIG. 1 shows how rules are implemented.

Conventionally, they are defined at the level of a policy manager (PM) and then transmitted to a policy server (PS). The policy server is responsible for their application by network elements which in this context are referred to as policy enforcement points (PEP).

The policy manager and the policy server are conventionally part of the network management layer (NML); to be more precise, they can belong to a network management system (NMS). However, it is important to note that a network may include only one of these elements, as the policy manager PM and the policy server PS can be two independent physical systems that can be marketed separately.

It is apparent that there is an important semantic difference between the definition of the service, for example in the context of an SLA/SLS, and the corresponding rules, which must be implemented by the network elements or PEP, in particular the configurations of the network elements.

In concrete terms, the difference can become apparent at two or more levels:

Firstly, it obliges the designer of the service to have network expert knowledge. For example, it is incumbent on the service designer to decide how a virtual private network VPN should be implemented, for example whether the IPsec protocol must be used, or if preference must be given to the multi-protocol label switching (MPLS) technology.

Secondly, it obliges the service designer to have access to the exact specifications of each network element to be configured. Depending on the manufacturer, the same type of network element (IP router, firewall, etc.) may be configured differently, because the capacities may be different.

The object of the present invention is to alleviate this drawback and to facilitate the development of new services by means of rules.

SUMMARY OF THE INVENTION

To this end, the invention provides a network management system for implementing a service on a network, the system including means for acquiring policy rules for configuring the service, means for determining commands corresponding to the policy rules and transmitting them to network elements, and processing means for inferring the rules in order to determine the commands, in which system the rules comprise services rules and implementation rules.

In one embodiment of the invention the processing means include an inference engine.

In one embodiment of the invention the implementation rules include technology rules and/or equipment rules.

Thus new services can be designed independently of the implementation by adding processing means to the network management system able to infer services rules and implementation rules dynamically.

In particular, the design process does not have to take account of the specifics of the various network elements or of expert data to choose between a set of technical solutions for implementing the new services.

The invention and its advantages will become more clearly apparent in the course of the following description of one embodiment of the invention, which refers to the accompanying drawing.

BRIEF DESCRIPTION OF THE DRAWING

FIG. 1, already commented on, represents a prior art system for managing a network using policy rules.

FIG. 2 is a diagram of a network management system according to the invention.

DETAILED DESCRIPTION OF THE PREFERRED EMBODIMENT

FIG. 2 shows a network management system NMS associated with a network N. The network N includes network elements $E_1, E_2 \ldots E_n$, which can be IP routers, asynchronous transfer mode (ATM) switches, etc. The network management layer communicates with the network N via a communication link C.

The network management system NMS includes processing means IE and two databases $D_T$ and $D_E$. Of course, the two databases could be two views of the same physical database.

The processing means IE preferably comprise an inference engine.

The processing means receive as input service rules $R_S$ and implementation rules. In the FIG. 2 example, the implementation rules are technology rules $R_T$ and equipment rules $R_E$.

A service rule can consist in creating a virtual private network (VPN) during a specified time period, for example.

Simplifying, a rule of this kind could take the form: "IF (timeperiod=March 2002) THEN (create VPN from site A to site B)". This rule stipulates that a virtual private network must be created between sites A and B during March 2002.

The processing means IE further employ implementation rules. The implementation rules can contain technology rules $R_T$, for example, stored in a database $D_T$.

The technology rules are used to model expert know-how and automate its application.

Accordingly, in the above example concerning the provision of a virtual private network, a choice may be made between different technologies. In particular, it can be implemented using the IPsec protocol, as defined in RFC 2401 of the Internet Engineering Task Force (IETF), or using multiprotocol label switching (MPLS) tunnels, as defined in IETF RFC 3031.

One strategy for choosing the technology might be to consider the number of sites involved in the virtual private network and to use that number as a basis for deciding which is the most appropriate technology:

for example, if the number of sites is less than five, then the IPsec protocol is preferred, whereas otherwise the MPLS protocol is chosen.

This strategy can be modeled in the form of technology rules $R_T$ and stored in the technology database $D_T$.

Simplifying, the technology rules $R_T$ can be written in the following form:

IF (number_of_sites<5) THEN (tunneling technology=IPsec)

IF (number_of_sites≧5) THEN (tunneling technology=MPLS).

The processing means IE can then correlate the service rules with the technology rules. The processing means can in particular include an inference engine. Inference engines include the "IlogRules" product from the company Ilog and the Java Expert System Shell (Jess).

In the same way, the processing means can use equipment rules $R_E$, which can be stored in an equipment database $D_E$.

The equipment rules are used to model how the rules must be adapted or selected for a particular equipment type. This is because two network equipments can have different capacities, even if they are functionally identical. Their capacities may depend on the network equipment manufacturer, or differ between different models in the range of the same manufacturer. For example, some equipment (such as routers) can optionally support the MPLS technology. The equipment rules $R_E$ can take this into account, so that the management system chooses the right implementation.

Returning to the same example, an equipment rule $R_E$ can be written as follows:

IF (equipment=TYPE1) THEN (tunneling technology=IPsec)

This means that if the Type1 equipments cannot support the MPLS technology, then IPSec is the only option.

If the equipment is not of Type1, then in this example no equipment rule is specified and the choice of the right implementation is effected on the basis of the technology rules $R_T$ previously referred to.

Accordingly, the services can be described in the form of service rules $R_S$ independently of the technology to be used and the specifics of the network equipment. The aspects related to the technology to be used and to those specifics can be modeled in the form of implementation rules (or metarules).

There is claimed:

1. A network management system for creating and implementing a service on a network, said network management system comprising:
   means for acquiring policy rules comprising service rules which create the service and implementation rules which implement the service;
   means for inferring said policy rules to determine commands corresponding to said policy rules; and
   means for transmitting the determined commands to network elements of the network,
   wherein said implementation rules for implementing the service comprise technology rules and equipment rules,
   wherein the inferring means correlates the service rules with the technology rules,
   wherein the technology rules determine technology to use in the implementation of the service based on attributes of the service and equipment in the network,
   wherein the service is defined by the service rules independently of the technology and specification of the network equipment,
   wherein the inferring means adapts the technology rules using the equipment rules based on an equipment type,
   wherein the technology rules specify which protocol to use for the service based on the attributes of the equipment in the network,
   wherein the equipment rules model how to select the technology rules based on the attributes of the equipment, and
   wherein the technology rules are different from the equipment rules.

2. The network management system claimed in claim 1, wherein said inference means comprises an inference engine provided in the network management system and external to the network comprising the network elements.

3. The network management system claimed in claim 1, wherein the service rules are provided externally from the network management system and wherein the service rules specify conditions and timing for creating the service.

4. The network management system claimed in claim 1, wherein the service is designed by a developer independently from specifications of equipment and technology specified in the implementation rules and wherein the implementation rules are dynamically implemented after the determining means determines applicable implementation rules.

5. The network management system claimed in claim 1, wherein the service is designed by an operator without requiring specific knowledge of equipment and technology of the network for the service.

6. The network management system claimed in claim 1, wherein the implementation rules specify implementation specific details of the service.

7. The network management system claimed in claim 1, wherein the implementation rules specify attributes of the service.

8. The network management system claimed in claim 1, wherein the service is a virtual private network.

9. The network management system claimed in claim 1, wherein the technology to be used is determined based on a number of sites involved in a particular network.

10. The network management systems claim in claim 1, wherein the equipment rules model how the technology rules must be selected for the particular equipment type.

11. The network management system claimed in claim 1, wherein the particular equipment type is selected based on their capacity.

12. The network management system claimed in claim 1, wherein the service provides video conferences.

13. The network management system claimed in claim 1, wherein the technology is Internet Protocol Security (IPsec) protocol.

14. The network management system claimed in claim 1, wherein the technology is multi-protocol label switching (MPLS) tunnels.

15. The network management system claimed in claim 1, wherein the equipment is a router.

16. The network management system claimed in claim 1, wherein the network comprises IP routers.

17. The network management system claimed in claim 1, wherein the network comprises asynchronous transfer mode (ATM) switches.

18. The network management system claimed in claim 1, wherein the equipment is an asynchronous transfer mode (ATM) switch.

19. The network management system claimed in claim 1, wherein the particular equipment type is selected based on a manufacturer.

20. The network management system of claim 1, further comprising a first database which stores the technology rules and a second database which stores the equipment rules.

\* \* \* \* \*